US010922700B2

(12) United States Patent
Heatherly (10) Patent No.: US 10,922,700 B2
(45) Date of Patent: Feb. 16, 2021

(54) SYSTEMS AND METHODS TO PROVIDE A SOFTWARE BENEFIT WHEN A CONSUMER OBJECT IS RECOGNIZED IN AN IMAGE

(75) Inventor: Christopher W. Heatherly, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1264 days.

(21) Appl. No.: 12/893,370

(22) Filed: Sep. 29, 2010

(65) Prior Publication Data

US 2012/0079608 A1    Mar. 29, 2012

(51) Int. Cl.
*A63F 13/00* (2014.01)
*G07F 17/32* (2006.01)
*G06Q 30/02* (2012.01)
*G06Q 30/00* (2012.01)

(52) U.S. Cl.
CPC ............ *G06Q 30/02* (2013.01); *G06Q 30/00* (2013.01)

(58) Field of Classification Search
CPC . A63F 13/00; A63F 13/25; A63H 3/28; G07F 17/32; G09B 5/06; G06T 13/80; G06F 16/337; G06Q 20/20
USPC ................ 705/1.1, 14, 14.56; 382/103, 115; 345/158; 463/1
See application file for complete search history.

(56) References Cited

U.S. PATENT DOCUMENTS

| | | | |
|---|---|---|---|
| 6,773,344 B1 * | 8/2004 | Gabai | A63H 3/28 463/1 |
| 7,425,169 B2 * | 9/2008 | Ganz | G06T 13/80 446/175 |
| 7,445,550 B2 * | 11/2008 | Barney | A63F 13/25 463/37 |
| 7,465,212 B2 * | 12/2008 | Ganz | G06Q 20/20 446/175 |
| 7,508,954 B2 | 3/2009 | Lev | |
| 2002/0102966 A1 | 8/2002 | Lev et al. | |
| 2005/0105769 A1 * | 5/2005 | Sloan | G06K 9/00 382/103 |
| 2005/0192864 A1 * | 9/2005 | Ganz | G06Q 30/0222 705/14.56 |
| 2005/0288998 A1 * | 12/2005 | Verma et al. | 705/14 |

(Continued)

FOREIGN PATENT DOCUMENTS

WO    2008/050097 A2    5/2008

OTHER PUBLICATIONS

Rik Myslewski, "Apple preps iPhone face recognition", The Register Guide to Enterprise Virtualization, Jul. 9, 2009, retrieved on Sep. 28, 2010, download from the Internet: http://www.theregister.co.uk/2009/07/09/more_july_apple_patents/print.html, 5pgs.

(Continued)

*Primary Examiner* — Lynda Jasmin
*Assistant Examiner* — Kimberly L Evans
(74) *Attorney, Agent, or Firm* — Esplin & Associates, PC (57) ABSTRACT

According to some embodiments, it may be recognized that a consumer has placed a consumer object, such as a toy or action figure, into a field of view of a camera (e.g., a video camera incorporated into a portable computer). A software benefit associated with the consumer object may then be automatically determined, and, responsive to the recognition and determination, it may be arranged for the consumer to receive that software benefit (e.g., in a virtual world).

22 Claims, 7 Drawing Sheets

(56) References Cited

U.S. PATENT DOCUMENTS

2007/0279244 A1* 12/2007 Haughawout et al. .. 340/825.22
2008/0235093 A1    9/2008 Uland
2009/0051653 A1* 2/2009 Barney et al. ................ 345/158
2018/0144649 A1* 5/2018 el Kaliouby .......... G06F 16/337
                                                                                          382/115

OTHER PUBLICATIONS

Kruger, Jennifer Barr, "Neven Vision mobile machine vision technology creates new ways to use images: whether for marketing, law enforcement, transaction security or fun, image recognition takes a great leap forward", Feb. 1, 2006, Publication: Digital Imaging Digest, retrieved on Sep. 28, 2010, download from the Internet: http://www.thefreelibrary.com/_/print/PrintArticle.aspx?id=142965107, 3pgs.

Article: "Neven Vision Extends Mobile Marketing Activities for Top Soft Drink Brand Using Innovative Object Recognition", Oct. 25, 2005, Business Wire, retrieved on Sep. 29, 2010, download from the Internet: http://www.highbeam.com/doc/1G1-137917758.html, 3pgs.

\* cited by examiner

| OBJECT ID | S/W BENEFIT | CONSUMER IDS |
|---|---|---|
| O_01 | UNLOCK GAME LEVEL | NA |
| O_02 | ADD VIRTUAL DOLL | (212) 555-1234; (212) 555-5678... |
| O_03 | TRIAL MEMBERSHIP | NA |
| O_04 | ACCESS TO NEW ISLAND | NA |

SYSTEMS AND METHODS TO PROVIDE A SOFTWARE BENEFIT WHEN A CONSUMER OBJECT IS RECOGNIZED IN AN IMAGE

FIELD

The present invention relates to systems and methods wherein a software benefit may be provided to a consumer. Some embodiments relate to systems and methods to efficiently provide a software benefit to a consumer when a consumer object is recognized in an image.

BACKGROUND

In some cases, a company may wish to provide a consumer with a benefit in connection with his or her purchase of a consumer product. For example, a consumer who purchases a doll may be able to log onto a web site to participate in a virtual environment associated with the doll. To verify that that consumer has, in fact, purchased the object a unique alphanumeric registration code may be provided on the object (or the packaging associated with the object). The consumer can then enter the code when he or she access a web site, the code may be verified, and the benefit can be provided to the consumer. Such an approach, however, can be awkward and confusing for consumers. For example, it may be difficult to accurately enter a lengthy registration code and/or the code may be misplaced by the consumer. These concerns may be especially important when the typically consumers are relatively young (e.g., entering a ten digit registration code can be a frustrating process for a six year old boy or girl).

DETAILED DESCRIPTION

Applicants have recognized that there is a need for methods, systems, apparatus, means and computer program products to efficiently and accurately provide a software benefit to a consumer who has purchased a consumer object. As used herein, the phrase "consumer object" may refer to any product that may be purchased by a consumer, including a toy, a doll, an action figure, a card (e.g., associated with a card game), a consumer object package, a sporting object, clothing, and/or a food item (e.g., to be given to consumers along with a pre-packaged meal). Moreover, the phrase "software benefit" may refer to an computer based benefit (e.g., online or off line), including unlocking a software feature, adjusting a virtual world, simulating the consumer product, providing the consumer with a membership, altering game play, and/or providing media content to the consumer (e.g., a music or video file).

Note that many toy and other consumer product companies may want to identify a discrete toy (or other item) as a way to unlock a corresponding virtual reward (e.g., a virtual item) in a virtual world or video game. Often, this is done by associating each toy with a unique alphanumeric identifier that is printed on the toy's packaging. When the code is typed into a game or virtual world, a remote server may verify the code and apply the corresponding award for the consumer. The server may also mark the code as "used" (e.g., so that another consumer cannot simply copy the code to receive another award). Such an approach, however, can be a time consuming and error prone process for consumers (especially for consumers who are relatively young).

Figure 1:
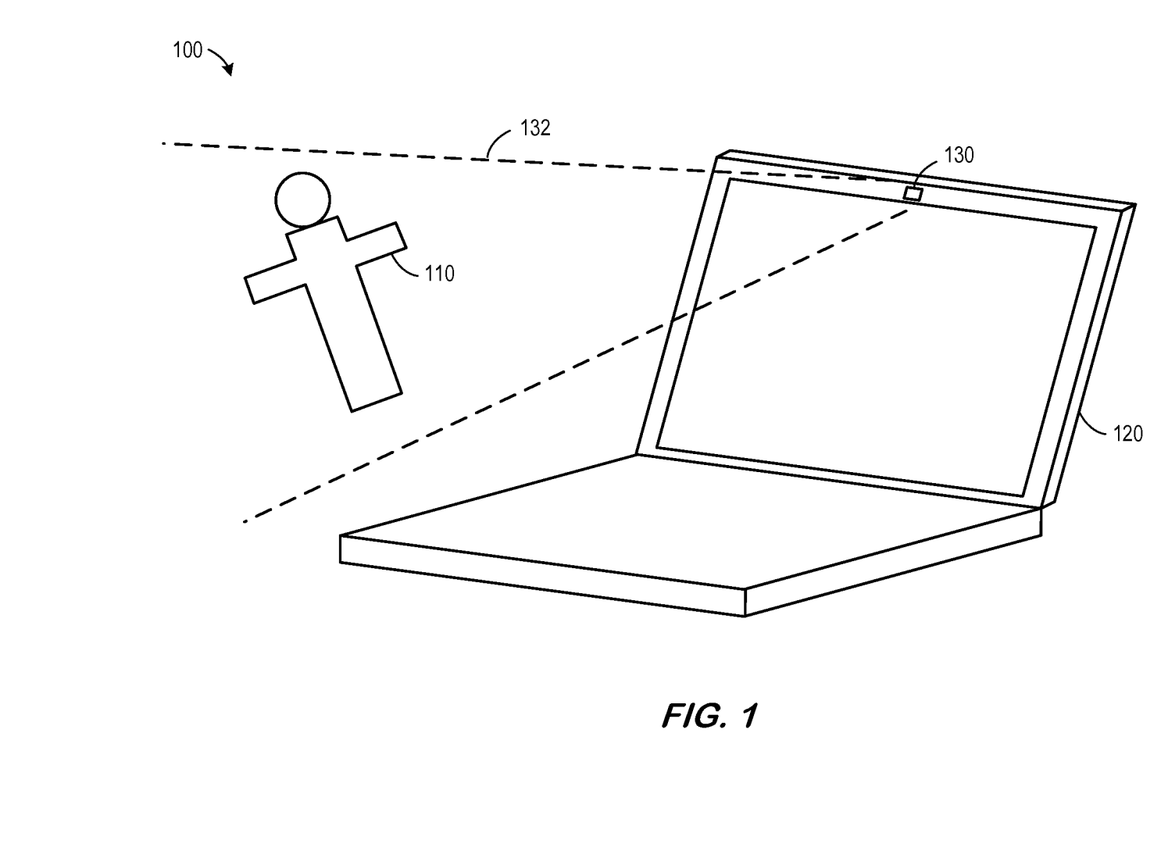
FIG. 1 is an illustration of a system according to some embodiments of the present invention.

To avoid such disadvantages, FIG. 1 illustrates a system 100 according to some embodiments of the present invention. In this example, a consumer object 110 is placed in front of a portable computer 120 having a camera 130. In particular, the consumer object 110 is placed within a field of view 132 of the camera 130. The camera 130 may be any device adapted to provide image information (e.g., a digital still camera or a digital video camera) and may be associated with, for example, a cell phone, a Personal Computer ("PC"), and/or a game system.

When the consumer object 110 is placed with the field of view 132 of the camera 130, a recognition engine of the portable computer 120 may recognize the consumer object 130 within the image information generated by the camera 130. For example, a software application executing on the portable computer 120 might analyze the information to detect when the consumer object 110 is placed within the field of view 132 of the camera 130. When the consumer object 110 is detected, a software benefit may be provided to the consumer. For example, he or she may be able to access a virtual representation of the consumer object 110 in an online gaming environment.

Figure 2:
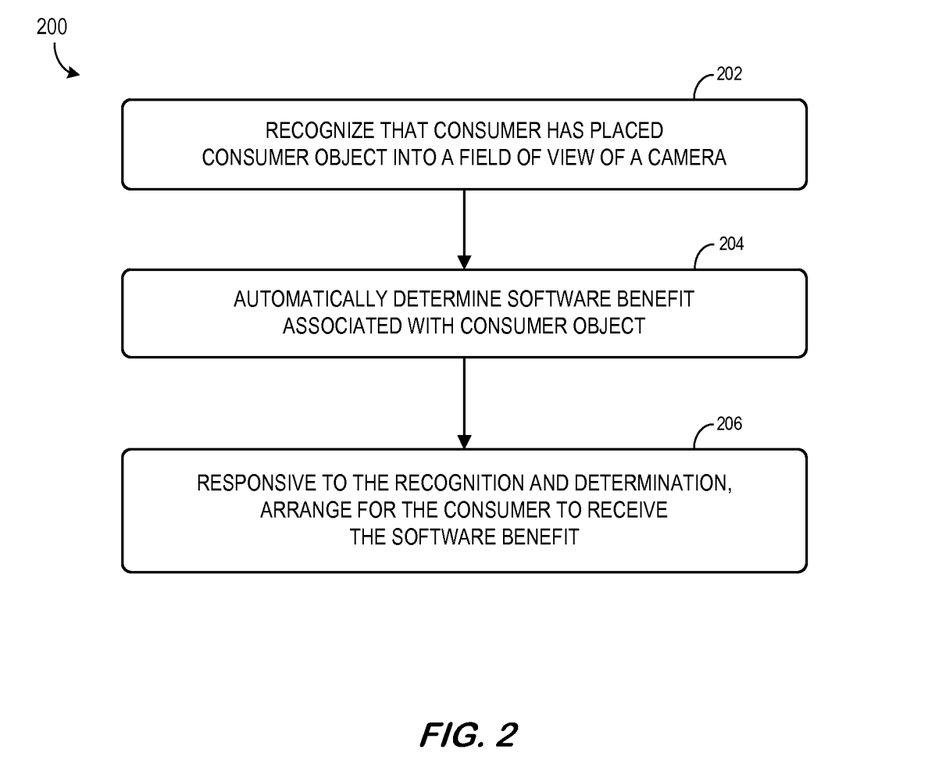
FIG. 2 is a flow chart of a method in accordance with some embodiments of the present invention.

FIG. 2 illustrates a method 200 that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, it is recognized that a consumer has placed a consumer object into a field of view of a camera. For example, computer vision and object recognition techniques may allow a computing device to "see" the consumer object and recognize what it is. According to some embodiments, multiple images of the consumer object (e.g., taken from different angles) may be used to facilitate object recognition.

At 204, a software benefit associated with the consumer object is automatically determined. In some cases, the consumer's PC or a remote server might access a database to determine a software benefit that is associated with the particular consumer object that was recognized at 202. For example, a child might place a puppy dog doll in front of a web camera or webcam. Once the doll is recognized, a database might indicate that the doll should unlock a virtual puppy dog for the child in a computer program. Note that other information may also be used to determine an appropriate software benefit for the consumer. For example, the system might further recognize that the consumer is within the field of view of the camera (e.g., using a facial recognition application) and the benefit might be based at least in part on the consumer's identify. In other cases, multiple consumer objects might need to be recognized (either simultaneously or over a period of time) before a software benefit is selected for the consumer. For example, the consumer might need to display five different action figures to receive a bonus in a video game.

At 206, responsive to the recognition and determination of 202 and 204, respectively, it is arranged for the consumer to receive the software benefit. For example, the consumer's PC or a remote service might let the consumer access exclusive content or a new level in a video game. According to some embodiments, wherein the software benefit is associated with use of the consumer product. For example, the software benefit might let the consumer play a song that is recognized by the puppy dog doll (e.g., and might cause the doll to do a unique dance in response to that particular song).

Figure 3:
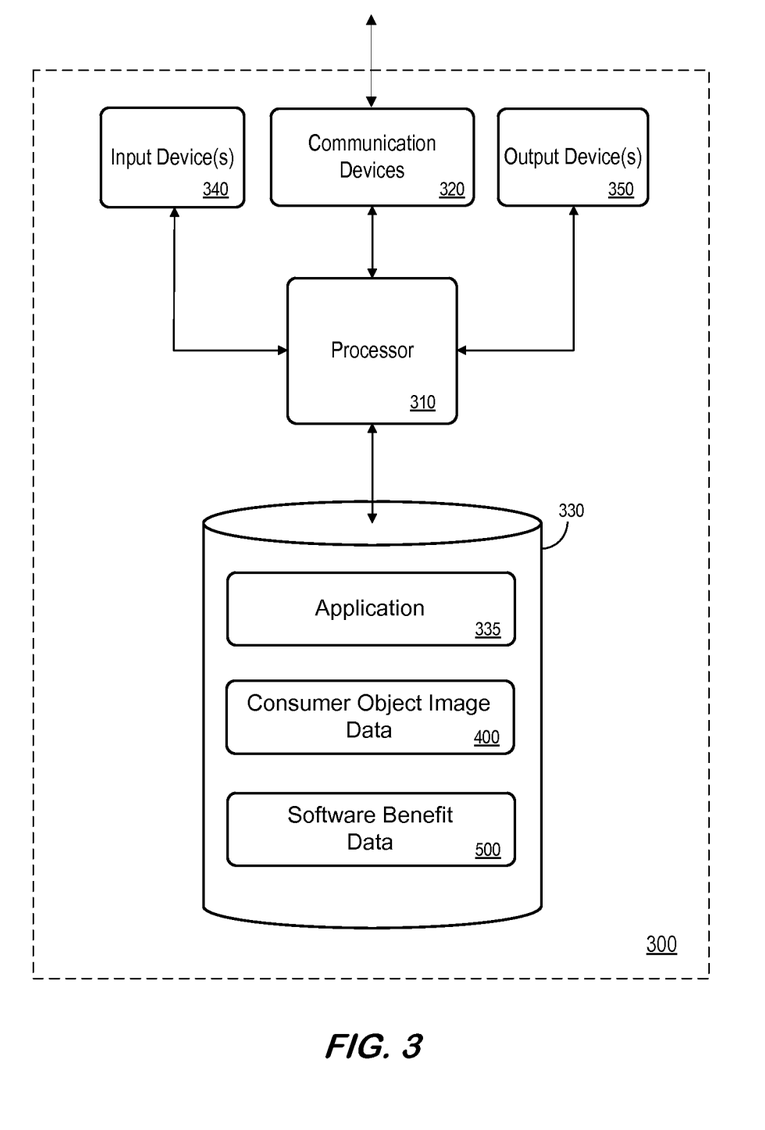
FIG. 3 is a block diagram of a platform in accordance with some embodiments of the present invention.

According to some embodiments, the recognizing, determining, and arranging of 202, 204, and 206, respectively, are performed locally at a consumer's computer. For example, FIG. 3 is a block diagram of a object recognition platform 300 that might be associated with, for example, the system 100 of FIG. 1 in accordance with some embodiments of the present invention. The object recognition platform 300 comprises a processor 310, such as one or more INTEL® Pentium® processors, coupled to communication devices 320 configured to communicate with remote devices (not shown in FIG. 3). The communication devices 320 may be used, for example, to receive consumer object image and/or software benefit updates from a remote server and/or perform an authentication function associated with a consumer or consumer object.

The processor 310 is also in communication with an input device 340. The input device 340 may comprise, for example, a camera, a keyboard, a mouse, a game controller, and/or a computer media reader. Such an input device 340 may be used, for example, to receive image information and/or information provided by a consumer. The processor 310 is also in communication with an output device 350. The output device 350 may comprise, for example, a display screen or printer. Such an output device 350 may be used, for example, to provide information, including a software benefit, to a consumer.

The processor 310 is also in communication with a storage device 330. The storage device 330 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 330 stores a rendering engine application 335 for controlling the processor 310. The processor 310 performs instructions of the application 335, and thereby operates in accordance any embodiments of the present invention described herein. For example, the processor 310 may recognize that a consumer has placed a consumer object into a field of view of a camera. The processor 310 may also automatically determine a software benefit associated with the consumer object, and, responsive to said recognition and determination, arrange for the consumer to receive the software benefit.

As used herein, information may be "received" by or "transmitted" to, for example: (i) the object recognition platform 300 from other devices; or (ii) a software application or module within object recognition platform 300 from another software application, module, or any other source.

As shown in FIG. 3, the storage device 330 also stores consumer object image data 400 and software benefit data 500. Example of such databases 400, 500 that might be used in connection with the object recognition platform 300 will now be described in detail with respect to FIGS. 4 and 5. The illustrations and accompanying descriptions of the databases presented herein are exemplary, and any number of other database arrangements could be employed besides those suggested by the figures.

Figure 4:
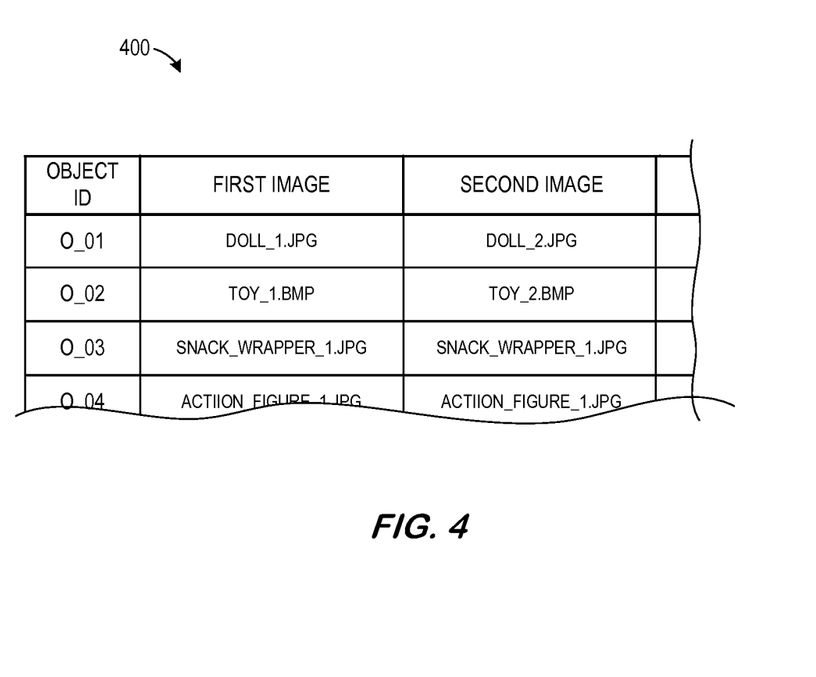
FIG. 4 is a tabular representation of a portion of a consumer object image data table according to some embodiments of the present invention.

FIG. 4 is a tabular representation of a portion of a consumer object image data table 400 in accordance with some embodiments of the present invention. The table 400 includes entries associated with different consumer objects. The table 400 also defines fields for each of the entries. The fields might specify an object identifier along with multiple images of the consumer object to facilitate recognition of the object. The information in the database 400 may be created and/or periodically updated based on information received from, for example, an installation disc included with a consumer object and/or a remote server. Note that image information associated with a single consumer object or multiple consumer objects (as illustrated in FIG. 4) and/or multiple manufacturers might be stored in the table. According to some embodiments, the table 400 may include other information to help facilitate recognition of a consumer object (e.g., computer models or distances between various object parts).

Figure 5:
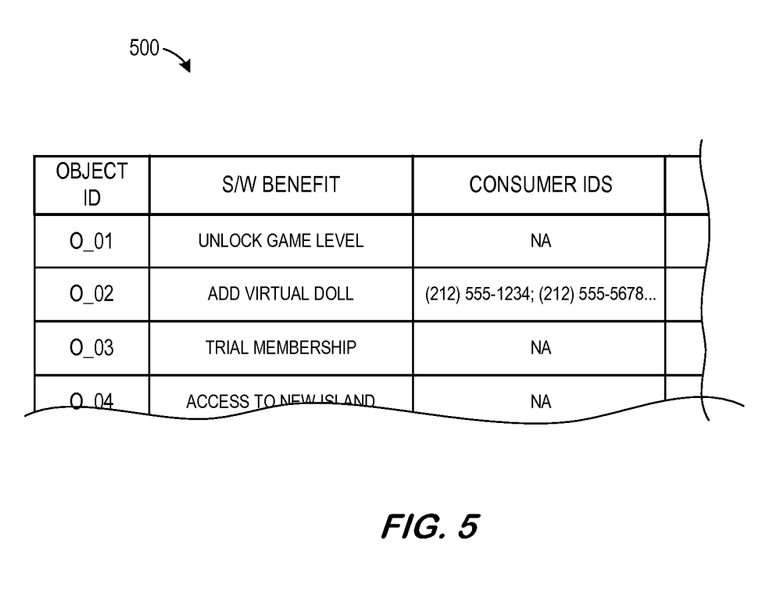
FIG. 5 is a tabular representation of a portion of a software benefit data table in accordance with some embodiments of the present invention.

FIG. 5 is a tabular representation of a portion of a software benefit data table 500 in accordance with some embodiments of the present invention. The table 500 includes entries associated with different consumer object. The table 500 also defines fields for each of the entries. The fields might specify an object identifier (e.g., identical to or based on the object identifier of FIG. 4). The information in the database 500 may be created and/or periodically updated based on information received from, for example, an installation disc included with a consumer object and/or a remote server. Note that software benefit information associated with a single consumer object or multiple consumer objects (as illustrated in FIG. 5) and/or multiple manufacturers might be stored in the table. Thus, when an object is recognized using the information in the consumer object image data table 400, the corresponding object identifier may be used to fin an appropriate software benefit to be provided to or unlocked for the consumer. Note that each object identifier in the software benefit data table 500 may also be associated with a list of consumer identifiers (IDs) representing consumers who have already received the software benefit (e.g., to prevent a consumer from receiving the benefit multiple times). According to another embodiment, the list of consumer identifiers instead represents consumers who are eligible to receive the benefit (e.g., because they have previously registered a product or have otherwise qualified to receive it) but have not yet done so.

Figure 6:
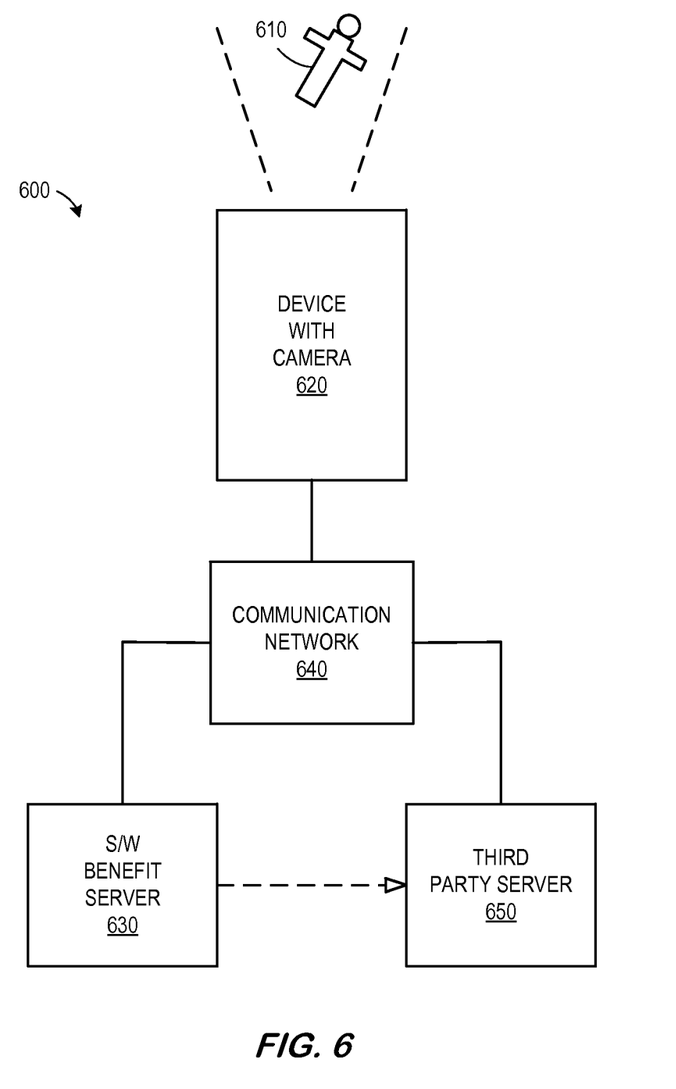
FIG. 6 is an illustration of a system in accordance with some embodiments of the present invention.

As noted, the determining of a software benefit and/or arranging to provide the benefit to a consumer may be performed locally by a consumer's PC or other computing device. According to other embodiments, at least one of the determining or arranging may be performed remote from the consumer. For example, FIG. 6 is an illustration of a system 600 in accordance with some embodiments of the present invention. In this case, the consumer places a consumer object 610 in front of a device with a camera 620. The device with a camera 620 may then recognize the consumer object and exchange information with a remote software benefit server 630 via a communication network 640 (e.g., the Internet and/or a wireless telephone network) to determine an appropriate software benefit. For example, the device with a camera 620 might transmit might transmit a message to the remote software benefit server 630 including a consumer object identifier (and, in some cases a consumer or consumer device identifier). The software benefit server 630 may then transmit information to the device with a camera 620 to arrange for the appropriate benefit to be provided to the consumer. According to some embodiments, the software benefit server 630 instead communicates with a third party server 650 to arrange for the software benefit to be provided to the consumer. For example, the third party server 650 might host an online virtual world and arrange for the consumer to have access to an exclusive item in that world because he or she displayed the consumer object 610 to the device with a camera 620.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 7:
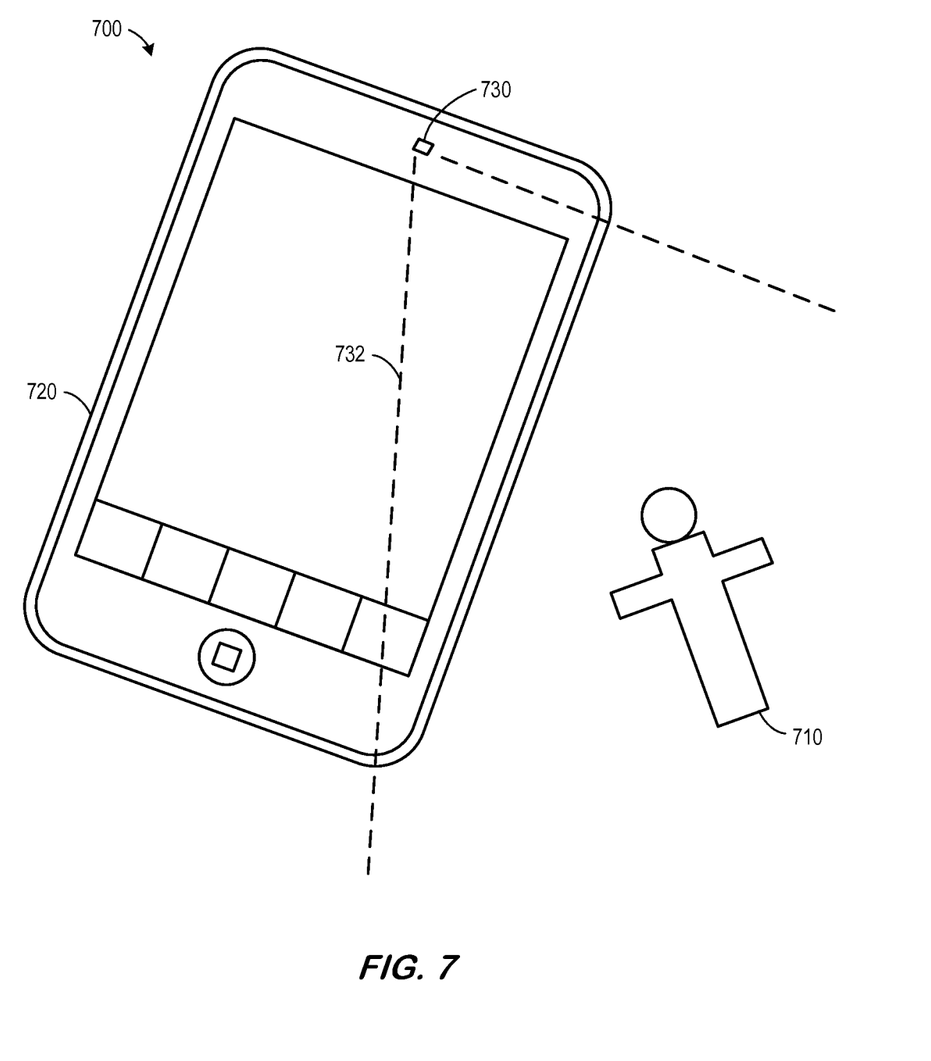
FIG. 7 is an illustration of a system in accordance with another embodiment of the present invention.

Although laptop computers have been described in some of the examples presented herein, note that other devices may be incorporated in addition to (or instead of) laptop computers in accordance with the present invention. For example, FIG. 7 is an illustration of a system 700 in accordance with another embodiment. In this case, a consumer object 710 is place in front of a smart phone 720. The smart phone 720 has a camera 730, and the consumer object 710 is placed within the field of view 732 of the camera 730. In this case, the smart phone 720 might recognize the consumer object 710 and arrange to provide a software benefit to the consumer.

Moreover, although specific hardware and data configurations have been described herein, note that any number of other configurations may be provided in accordance with embodiments of the present invention (e.g., some of the information associated with the databases and platforms described herein may be split, combined, and/or handled by external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of authenticating purchase of consumer objects and rewarding users for purchase of the consumer objects based on user-captured images of the consumer objects, the method being implemented in a computer system including one or more physical processors and storage media storing machine-readable instructions, the method comprising:

receiving, at the one or more physical processors, image information captured by a camera, the image information corresponding to one or more images captured by the camera;

identifying, by the one or more physical processors, a consumer object from the image information based on the consumer object being portrayed in a first image, the consumer object embodying a physical appearance of a virtual object of a virtual world, the identification being based on a comparison of the image information with at least one stored image of the consumer object;

determining, by the one or more physical processors, a software benefit to provide to a user of the consumer object, the software benefit being a reward for purchase of the consumer object; and responsive to the identification of the consumer object and determination of the software benefit, providing, by the one or more physical processors, the software benefit to the user as the reward for purchase of the consumer object, the software benefit comprising unlocking the virtual object within the virtual world.

2. The method of claim 1, wherein the consumer object comprises one or more of a toy, a doll, an action figure, a card, a consumer object package, a sporting object, clothing, or a food item.

3. The method of claim 1, wherein the software benefit further comprises one or more of unlocking a software feature, adjusting the virtual world, providing the user with a membership, altering game play within the virtual world, or providing media content to the user in the virtual world.

4. The method of claim 1, wherein the software benefit is associated with use of the consumer object.

5. The method of claim 1, wherein the camera is associated with one or more of a video camera, a cell phone, a personal computer, a portable computer, or a game system.

6. The method of claim 1, wherein the one or more physical processors are included in a computing platform that is associated with the user.

7. The method of claim 1, wherein the determination is performed in connection with one or more of a consumer product image database, or a software benefit database.

8. The method of claim 1, further comprising associating a user identifier with the consumer object.

9. The method of claim 1, further comprising:

recognizing that the user is within a field of view of the camera.

10. A system configured for authenticating purchase of consumer objects and rewarding users for purchase of the consumer objects based on user-captured images of the consumer objects, the system comprising:

a camera configured to provide image information corresponding to images captured by the camera, the image information including first image information corresponding to a first image of a consumer object, the consumer object embodying a physical appearance of a virtual object of a virtual world;

one or more physical processors configured by machine-readable instructions to:

obtain the first image information;

identify the consumer object within the first image based on the first image information;

determine a software benefit that is a reward for purchase of the consumer object;

determine whether a user associated with the consumer object is eligible to receive the software benefit based at least in part on a list of user identifiers, the list of user identifiers representing one or more of users who have already received the software benefit and are thus no longer eligible to receive the software benefit or users who have not yet received the software benefit and are eligible to receive the software benefit; and responsive to the identification of the consumer object and a determination that the user is eligible to receive the software benefit, provide the software benefit to the user as the reward for purchase of the consumer object, the software benefit comprising unlocking the virtual object within the virtual world.

11. The system of claim 10, wherein the consumer object comprises one or more of a toy, a doll, an action figure, a card, a consumer object package, a sporting object, clothing, or a food item.

12. The system of claim 10, wherein the software benefit further comprises one or more of unlocking a software feature, adjusting the virtual world, providing the user with a membership, altering game play within the virtual world, or providing media content to the user within the virtual world.

13. The system of claim 10, wherein the camera is associated with one or more of a video camera, a cell phone, a personal computer, a portable computer, or a game system.

14. The system of claim 10, wherein the one or more physical processors are further configured by machine-readable instructions to:
store images of consumer objects in a consumer object image database; and
store available software benefits in a software benefit database.

15. A non-transitory, computer-readable medium having instruction embodied thereon, the instructions being executable by a computing platform including one or more physical processors to perform a method of authenticating purchase of consumer objects and rewarding users for purchase of the consumer objects based on user-captured images of the consumer objects, the method comprising:
identifying a consumer object within an image of the consumer object captured by a camera, the consumer object embodying a physical appearance of a virtual object of a virtual world;
determining a software benefit that is a reward for purchase of the consumer object;
determining whether a user of the consumer object is eligible to receive the software benefit based at least in part on a list of user identifiers representing one or more of users who have already received the software benefit and are thus no longer eligible to receive the software benefit or users who have not yet received the software benefit and are eligible to receive the software benefit; and
responsive to the identification of the consumer object and a determination that the user is eligible to receive the software benefit, provide the software benefit to the user as the reward for purchase of the consumer object, the software benefit comprising unlocking the virtual object within the virtual world.

16. The medium of claim 15, wherein the consumer object comprises one or more of a toy, a doll, an action figure, a card, a consumer object package, a sporting object, clothing, or a food item.

17. The medium of claim 15, wherein the software benefit comprises one or more of unlocking a software feature, adjusting the virtual world, providing the user with a membership, altering game play within the virtual world, or providing media content to the user within the virtual world.

18. The medium of claim 15, wherein the camera is associated with one or more of a video camera, a cell phone, a personal computer, a portable computer, or a game system.

19. The medium of claim 15, further comprising associating a user identifier with the consumer object.

20. A method of authenticating purchase of consumer objects and rewarding users for purchase of the consumer objects based on user-captured images of the consumer objects, the method being implemented in a computer system including one or more physical processors and storage media storing machine-readable instructions, the method comprising:
identifying, by the one or more physical processors, a consumer object from an image of the consumer object captured by a camera, the consumer object embodying a physical appearance of a virtual object of a virtual world;
determining, by the one or more physical processors, a software benefit associated with the consumer object, the software benefit being a reward for purchase of the consumer object;
determining, by the one or more physical processors, whether a user associated with the consumer object is eligible to receive the software benefit based at least in part on a list of user identifiers representing one or more of users who have already received the software benefit and are thus no longer eligible to receive the software benefit or users who have not yet received the software benefit and are eligible to receive the software benefit; and
responsive to the identification of the consumer object and a determination that the user is eligible to receive the software benefit, providing, by the one or more physical processors, the software benefit to the user as the reward for purchase of the consumer object;
wherein the software benefit comprises unlocking the virtual object within the virtual world.

21. The method of claim 20, wherein the software benefit further comprises adjusting the virtual world.

22. The method of claim 20, wherein the software benefit further comprises:
providing access of one or more of a bonus in the virtual world, exclusive content in the virtual world, or a new gameplay level in the virtual world.

* * * * *